(12) United States Patent
Yabuki

(10) Patent No.: US 10,515,578 B2
(45) Date of Patent: Dec. 24, 2019

(54) ELECTRICAL CIRCUIT AND DISPLAY APPARATUS

(71) Applicant: Sakai Display Products Corporation, Sakai-shi, Osaka (JP)

(72) Inventor: Haruhito Yabuki, Sakai (JP)

(73) Assignee: Sakai Display Products Corporation, Sakai-shi, Osaka (JP)

( * ) Notice: Subject to any disclaimer, the term of this patent is extended or adjusted under 35 U.S.C. 154(b) by 120 days.

(21) Appl. No.: 15/574,751

(22) PCT Filed: May 20, 2015

(86) PCT No.: PCT/JP2015/064485
§ 371 (c)(1),
(2) Date: Nov. 16, 2017

(87) PCT Pub. No.: WO2016/185585
PCT Pub. Date: Nov. 24, 2016

(65) Prior Publication Data
US 2018/0151107 A1    May 31, 2018

(51) Int. Cl.
*G09G 3/20* (2006.01)
*G09G 3/36* (2006.01)
(Continued)

(52) U.S. Cl.
CPC ............ *G09G 3/2096* (2013.01); *G09G 3/36* (2013.01); *G09G 2310/08* (2013.01);
(Continued)

(58) Field of Classification Search
CPC ....... G09G 2310/08; G09G 2310/0297; G09G 2310/0223; G09G 2310/0233;
(Continued)

(56) References Cited

U.S. PATENT DOCUMENTS

| 6,636,607 B1 * | 10/2003 | Yang | ........................ | H04N 5/60 |
| | | | | 348/E5.122 |
| 7,095,407 B1 * | 8/2006 | Erhart | ...................... | G09G 3/20 |
| | | | | 345/204 |

(Continued)

FOREIGN PATENT DOCUMENTS

| JP | H01-213042 A | 8/1989 |
| JP | 2012-039173 A | 2/2012 |

(Continued)

*Primary Examiner* — Kent W Chang
*Assistant Examiner* — Nathaniel P Brittingham
(74) *Attorney, Agent, or Firm* — Rudy J. Ng; Bret E. Field; Bozicevic, Field & Francis LLP

(57) ABSTRACT

Provided are an electric circuit and a display device having the electric circuit. The electric circuit comprises a transmission unit and one or more reception units that perform data frame communications with the transmission unit via a plurality of buses. In the electric circuit, scramble processing is performed during the data frame communications, wherein the scramble processing is performed at different timings for the respective buses with respect to the data frame communication time, whereby the occurrence of EMI noise can be more reliably reduced without increasing the number of components (for example, gaskets).

4 Claims, 7 Drawing Sheets

(51) Int. Cl.
*H04N 5/38* (2006.01)
*H04N 5/44* (2011.01)

(52) U.S. Cl.
CPC ........... *G09G 2330/06* (2013.01); *H04N 5/38* (2013.01); *H04N 5/44* (2013.01)

(58) Field of Classification Search
CPC ... G09G 2310/3258; G09G 2310/0243; G09G 2310/027; G09G 2310/0286; G09G 2310/064; G09G 2310/12; G09G 2320/06; G09G 3/2003; G09G 3/3233; G09G 3/342; G09G 3/3685; G09G 3/3648; G09G 3/3677; G06F 3/044; G06F 3/0412; G06F 3/0418; G06F 3/0416
See application file for complete search history.

(56) References Cited

U.S. PATENT DOCUMENTS

| | | | | |
|---|---|---|---|---|
| 7,262,757 | B2* | 8/2007 | Morita | G09G 3/3648 345/100 |
| 8,274,468 | B2* | 9/2012 | Hori | G09G 3/20 345/100 |
| 8,362,997 | B2* | 1/2013 | Huang | G09G 3/20 345/213 |
| 8,743,256 | B2* | 6/2014 | Ogasawara | H04N 5/3765 348/294 |
| 9,953,598 | B2* | 4/2018 | Lee | G09G 3/3648 |
| 2004/0075773 | A1* | 4/2004 | Kimura | H04H 60/16 348/571 |
| 2006/0061517 | A1* | 3/2006 | Jolly | G09G 5/003 345/1.1 |
| 2011/0157104 | A1* | 6/2011 | Kang | G09G 3/2096 345/204 |
| 2011/0199369 | A1* | 8/2011 | Huang | G09G 3/20 345/213 |
| 2012/0014461 | A1 | 1/2012 | Sasaki | |
| 2012/0038621 | A1* | 2/2012 | Nose | G09G 3/3648 345/213 |
| 2012/0321002 | A1 | 12/2012 | Akita | |
| 2013/0195218 | A1* | 8/2013 | Whitby-Strevens | H04B 15/00 375/296 |
| 2013/0279622 | A1* | 10/2013 | Iyer | H04L 1/0009 375/285 |
| 2013/0285998 | A1* | 10/2013 | Hong | G06F 3/038 345/212 |
| 2014/0232713 | A1* | 8/2014 | Hsu | G09G 3/3685 345/213 |
| 2015/0049076 | A1* | 2/2015 | Kim | G09G 3/20 345/212 |
| 2015/0187315 | A1* | 7/2015 | Park | G09G 3/3685 345/99 |
| 2016/0019848 | A1* | 1/2016 | Isono | G09G 3/3611 345/214 |
| 2016/0203802 | A1* | 7/2016 | Hong | G09G 5/006 345/534 |
| 2018/0151107 | A1* | 5/2018 | Yabuki | G09G 3/2096 |
| 2018/0190238 | A1* | 7/2018 | Park | G09G 5/008 |

FOREIGN PATENT DOCUMENTS

| | | |
|---|---|---|
| JP | 2014-529269 A | 10/2014 |
| WO | WO2010109668 A1 | 9/2010 |

* cited by examiner

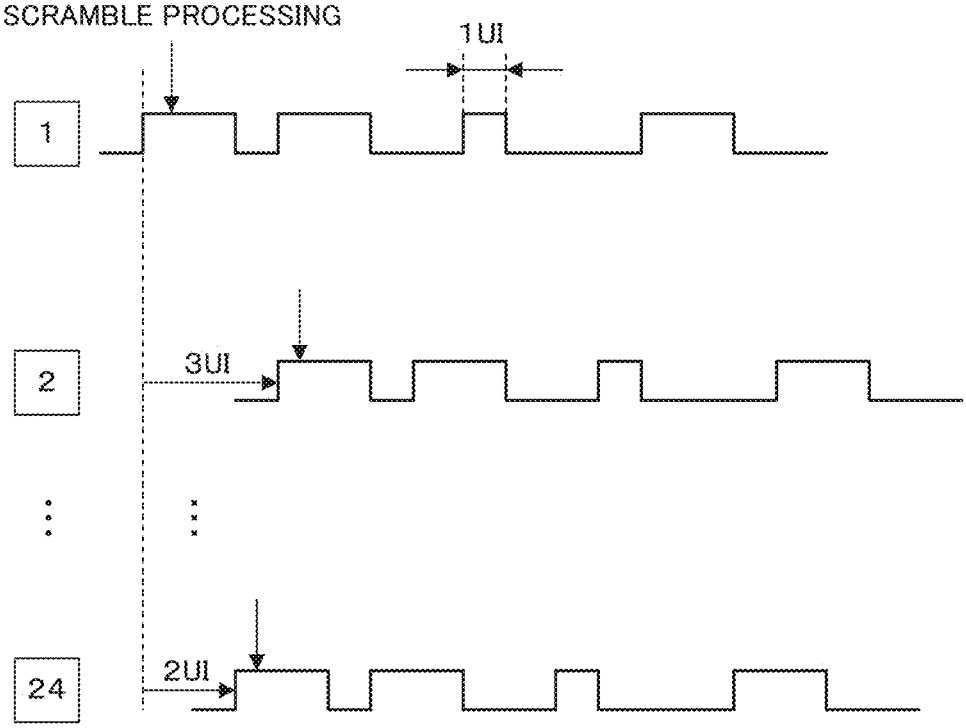

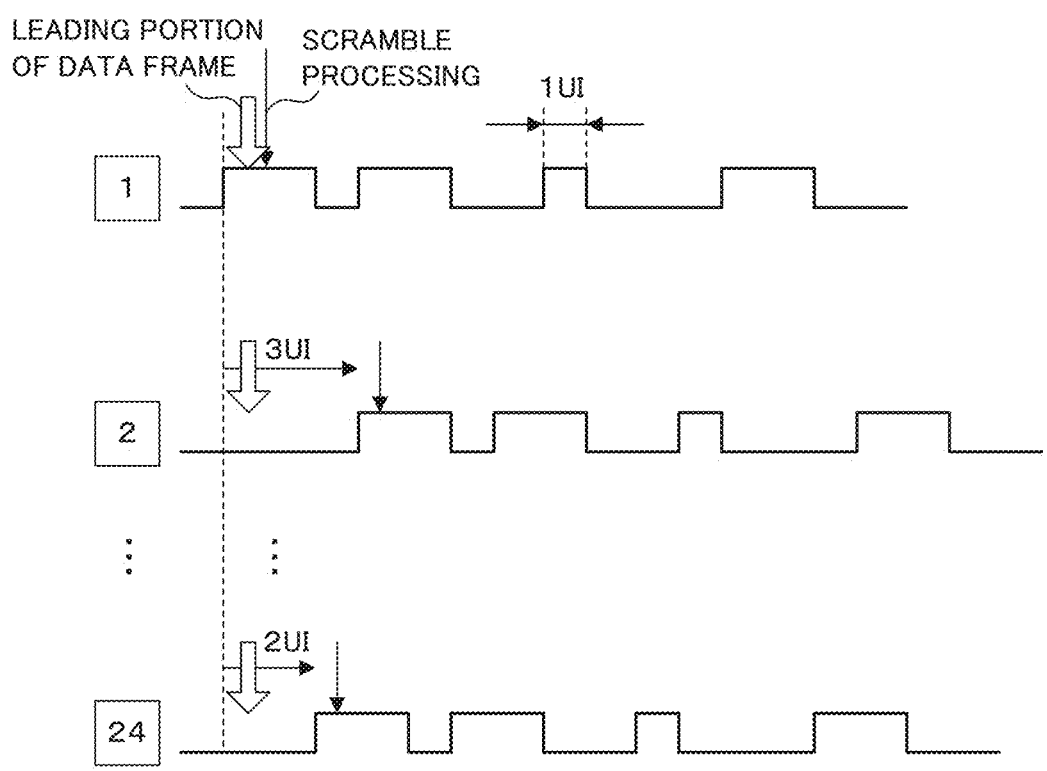

ELECTRICAL CIRCUIT AND DISPLAY APPARATUS

CROSS-REFERENCE TO RELATED APPLICATIONS

This application is the national phase under 35 U.S.C. § 371 of PCT International Application No. PCT/JP2015/064485 which has an International filing date of May 20, 2015 and designated the United States of America.

BACKGROUND

Technical Field

The present invention relates to an electrical circuit which includes a transmission unit and one or a plurality of reception units for performing communication of data frames with the transmission unit through a plurality of buses, and is configured to perform scramble processing during the communication of the data frames, and a display apparatus.

Description of Related Art

Conventionally, in communication of data between a transmission device and a reception device using a plurality of buses, a problem of electro magnetic interference (EMI) noise has occurred.

For the EMI noise problem, scramble processing using a so-called random number is known in an existing electric equipment having a high data communication speed.

The scramble processing is a technique known per se in the art, and therefore will not be described in detail.

Meanwhile, Japanese Patent Laid-open Publication No. 2012-39173 discloses a transmission device capable of reducing the EMI noise by generating data and a clock to be transmitted to a reception apparatus, generating and transmitting the clock which has an intermittent phase shift, and transmitting the data in synchronization with the clock.

SUMMARY

However, in the present day when a communication speed of data is more increased, to reduce the EMI noise by the scramble processing is not sufficient.

FIG. 7 is a timing chart describing a problem of a conventional scramble processing. In the timing chart, horizontal axes represent time and a vertical axis represents each bus.

As can be seen from FIG. 7, conventionally, the scramble processing has been performed at the same timing in all the buses of first bus to n-th bus. That is, phases of leading portions of the data frames have been aligned in all the buses.

Therefore, the scramble processing is performed for each bus, but, since the phases of the leading portions are aligned in all the buses, the scramble processings are performed at the same time. Thereby, an interference between the buses has occurred to cause the EMI noise. However, in Patent Document 1, for such a problem caused in the case of using the plurality of buses, any research has not been undertaken and therefore such a problem has yet to be solved.

In consideration of the above-described circumstances, it is an object of the present invention to provide an electrical circuit which includes a transmission unit and one or a plurality of reception units for performing communication of data frames with the transmission unit through a plurality of buses, and is configured to perform scramble processing during the communication of the data frames, wherein the scramble processing is performed at a different timing in communication time of the data frame for each bus, such that an occurrence of EMI noise may be more reliably reduced, and a display apparatus including the electrical circuit.

According to one embodiment of the present invention, there is provided an electrical circuit which comprises a transmission unit, and one or a plurality of reception units that performs communication of data frame with the transmission unit through a plurality of buses, and is configured to perform scramble processing during the communication of the data frame, wherein the scramble processing is performed at a different timing in communication time of the data frame for each bus.

According to the present invention, during the communication of the data frames, the scramble processing is performed at a different timing in the communication time of the data frame for each bus.

In the electrical circuit according to the embodiment of the present invention, wherein the transmission unit may comprise a delay unit configured to generate an output delay by nUIs between arbitrary two buses: the n is an integer, provided that the n is not 0 between arbitrary two or more buses, and the UI is one cycle of a data rate.

According to the present invention, the delay unit of the transmission unit generates the output delay by nUIs between the arbitrary two buses, such that, during the communication of the data frame, the scramble processing is performed at a different timing in the communication time of the data frame for each bus.

In the electrical circuit according to the embodiment of the present invention, it is prefer that the reception unit comprises a release unit configured to release the processing performed by the delay unit on data received from the transmission unit.

According to the present invention, when the reception unit receives the data from the transmission unit, the release unit releases the processing performed by the delay unit on the data received.

In the electrical circuit according to the embodiment of the present invention, wherein the transmission unit may comprise a scramble unit configured to perform the scramble processing so as to generate a timing difference by nUIs between the data frames of arbitrary two buses: the n is an integer, provided that the n is not 0 between arbitrary two or more buses, and the UI is one cycle of a data rate.

According to the present invention, the scramble unit of the transmission unit performs the scramble processing so as to generate a timing difference by nUIs between the data frames of the arbitrary two buses, such that, during the communication of the data frame, the scramble processing is performed at a different timing in the communication time of the data frame for each bus.

In the electrical circuit according to the embodiment of the present invention, it is prefer that the reception unit comprises a release unit configured to release the scramble processing performed by the scramble unit on data received from the transmission unit.

According to the present invention, when the reception unit receives the data from the transmission unit, the release unit releases the scramble processing performed by the scramble unit on the data received.

According to one embodiment of the present invention, there is provided a display apparatus comprising: the electrical circuit according to any one of claims 1 to 5, and a liquid crystal display panel connected to the electrical circuit, wherein the liquid crystal display panel displays an image based on data received through the electrical circuit.

According to the present invention, an EMI noise in data is reduced due to the processing performed by the delay unit or the scramble processing performed by the scramble unit. The data is transmitted to the liquid crystal display panel through the electrical circuit, and the liquid crystal display panel displays the image based on the received data.

According to the present invention, it is possible to further reduce an occurrence of the EMI noise without increasing the number of parts (for example, gaskets).

The above and further objects and features will move fully be apparent from the following detailed description with accompanying drawings.

BRIEF DESCRIPTION OF THE SEVERAL VIEWS OF THE DRAWINGS

FIG. 3 is a timing chart describing processing in which a serializer in the liquid crystal television according to Embodiment 1 shifts timings of the leading portions of the data frames.

FIG. 6 is a timing chart describing processing in which each scrambler of the liquid crystal television according to Embodiment 2 performs the scramble processing at a different timing.

DETAILED DESCRIPTION

Hereinafter, an example in which an electrical circuit and a display apparatus according to embodiments of the present invention are applied to a so-called liquid crystal television will be described in detail with reference to the accompanying drawings.

(Embodiment 1)

Figure 1:
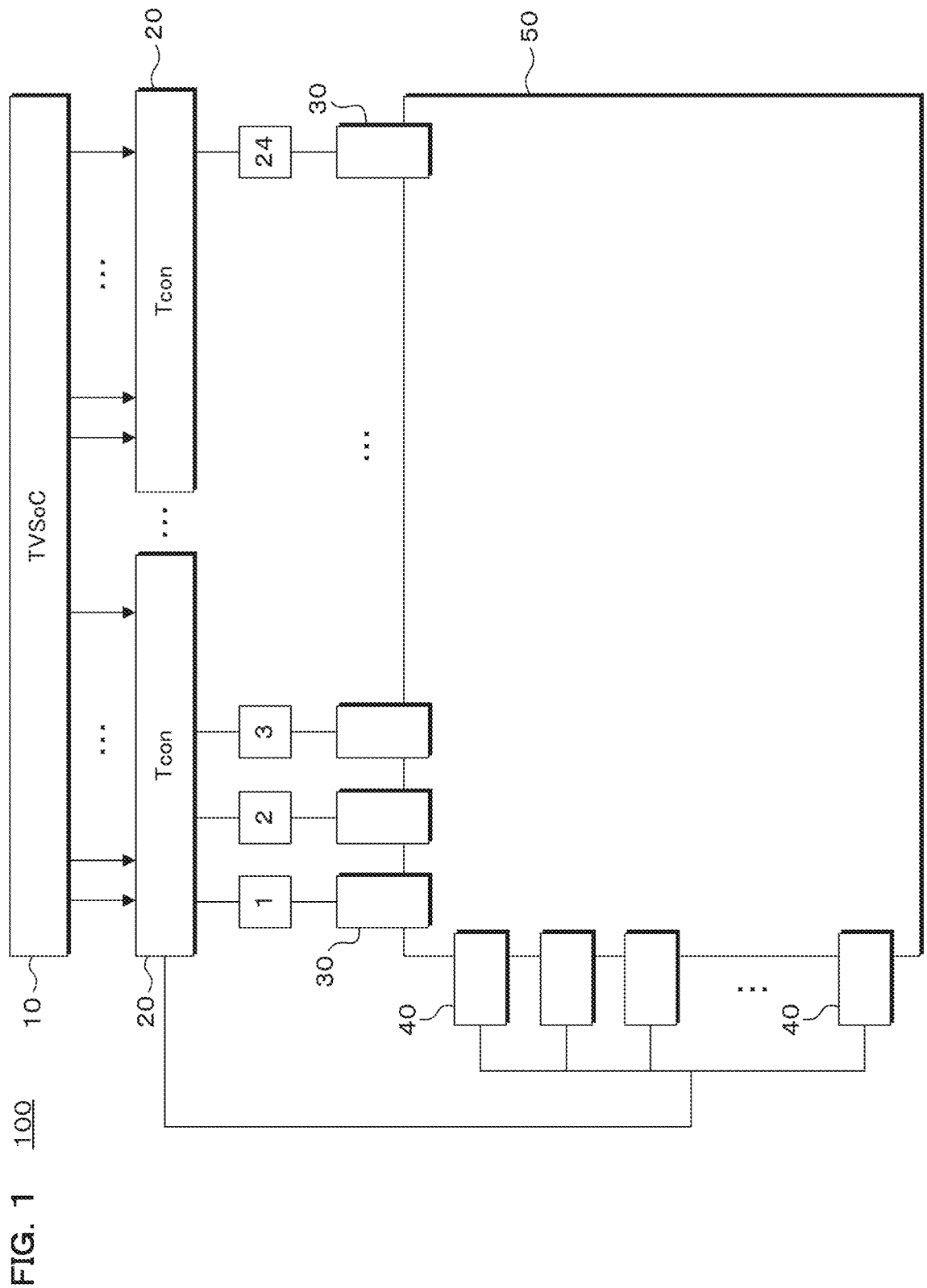
FIG. 1 is a functional block diagram illustrating a configuration of main components of a liquid crystal television according to Embodiment 1.

FIG. 1 is a functional block diagram illustrating a configuration of main components of a liquid crystal television 100 according to Embodiment 1.

The liquid crystal television 100 includes a TV system on a chip (TVSoC) 10 (a transmission unit), a plurality of timing controllers (Tcons) 20 configured to receive data from the TVSoC 10, a plurality of source drivers 30 (reception units) configured to receive the data from the Tcons 20 (the transmission units), and gate drivers 40. The source drivers 30 and the gate drivers 40 are connected to a liquid crystal display panel 50 on which an image is displayed based on such the data.

The electrical circuit described in the claims includes, for example, the TVSoC 10 and the Tcons 20, or the Tcons 20 and the source drivers 30.

The TVSoC 10, which is a so-called television reception circuit, receives a CVBS signal, an HDMI (registered trademark) signal, and the like to generate a television image, and outputs television image signals, horizontal synchronization signals, vertical synchronization signals and image signals including clocks to the Tcons 20 using a V-by-One signal standard.

The Tcon 20 generates digital image signals, control signals for controlling an operation of a driving circuit of the liquid crystal display panel 50, and the like, based on the signals (data) from the TVSoC 10. Then, the Tcon 20 transmits the digital image signals (hereinafter, also briefly referred to as image signals) and the control signals to the source drivers 30 and the gate drivers 40. That is, the Tcon 20 generates source timing control signals for controlling operation timings of the source drivers 30, and gate timing control signals for controlling operation timings of the gate drivers 40, by using timing signals such as the vertical synchronization signal (VS), the horizontal synchronization signal (HS), a data enable signal (DE), a clock signal (CLK) and the like.

In addition, the source driver 30 and the gate driver 40 include one semiconductor integrated circuit (IC), respectively, and the Tcons 20 and the source drivers 30 are connected by, for example, 24 buses.

Each pixel (not illustrated) of the display panel 50 is connected to the source driver 30 and the gate driver 40 through source line and gate line.

Figure 2:
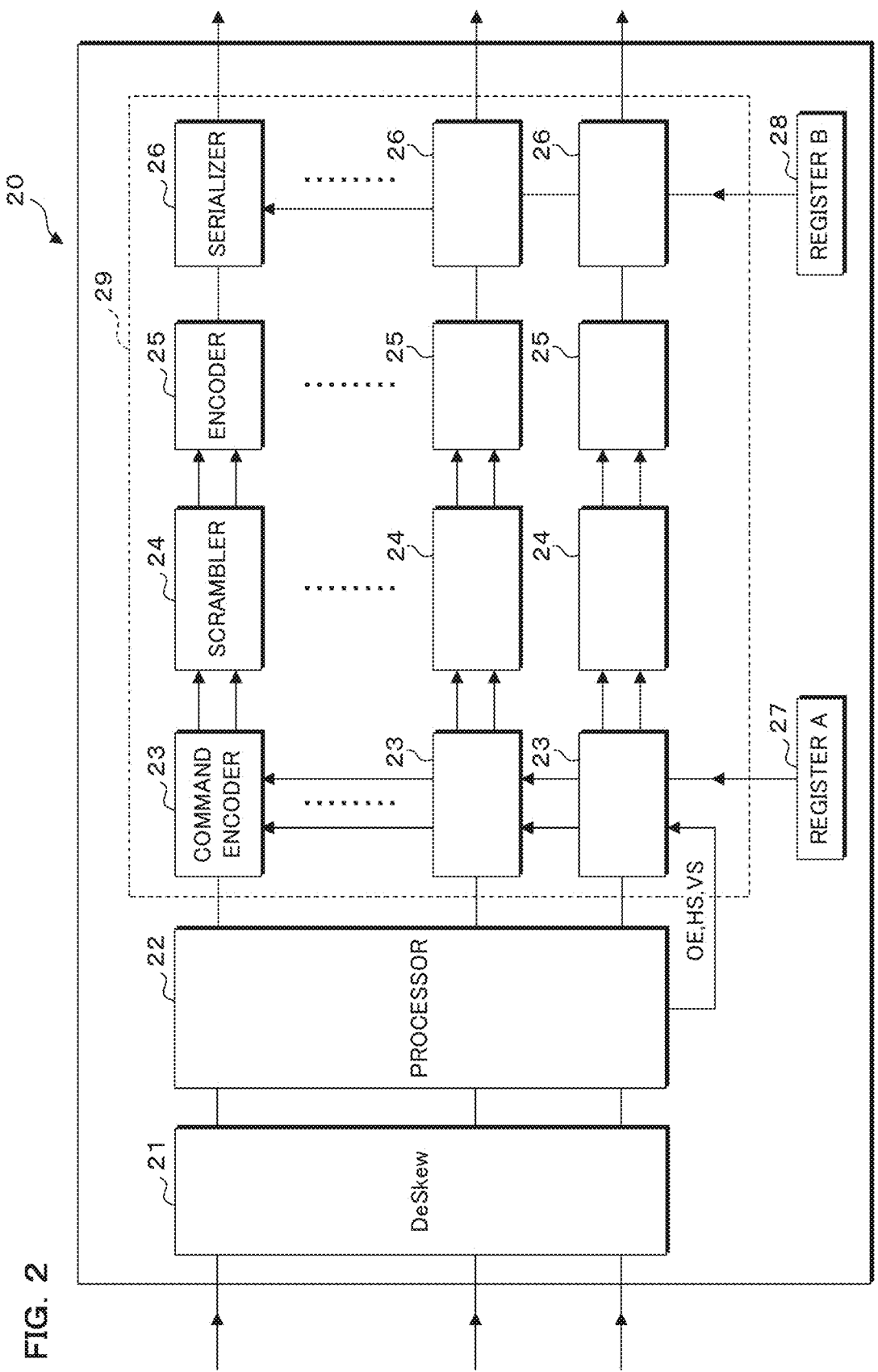
FIG. 2 is a functional block diagram illustrating a configuration of main components of a Tcon in the liquid crystal television of Embodiment 1.

FIG. 2 is a functional block diagram illustrating a configuration of main components of the Tcon 20 in the liquid crystal television 100 according to Embodiment 1.

In Embodiment 1, the Tcon 20 includes a DeSkew 21, a processor 22, and a transmitter 29.

Since the Tcon 20 receives the signal through the V-by-One signal standard, two signals may be received. The two signals received by the Tcon 20 are converted into 34 parallel signals of 10 bits.

At this time, the DeSkews 21 receive the parallel signals and separates the above-described timing signals except image signals (for R, G and B). That is, 30 image signals and 4 timing signals are generated and transmitted to the processor 22.

These signals are subjected to processing known in the art such as over drive, dither, or the like in the processor 22, and the timing signals and 24 image signals of 8 bits are individually transmitted to the transmitter 29.

The transmitter 29 includes a plurality of command encoders 23, a plurality of scramblers 24, a plurality of encoders 25, and a plurality of serializers 26, which have the same number as each other, respectively.

The timing signals and 24 image signals of 8 bits from the processor 22 are first input to the command encoders 23. The command encoder 23 receives a prescribed instruction signal (for example, a setting value related to the image signal) from a register A 27, together with the image signals for each RGB, the synchronization signals (HS and VS), the data enable signal (DE), and the clock signal (CLK).

The command encoder 23 generates a control code based on the data enable signal. Further, the command encoder 23 processes the image signal and the synchronization signals (HS and VS) based on the clock signal (CLK), and generates 24 parallel packet signal of 8 bits. The command encoders 23 output these packet signals of 8 bits, the control code, and the clock signal to the scrambler 24.

Next, the scrambler 24 (a scramble unit) has a random number generator (not illustrated), and executes scramble processing on the packet signal of 8 bits using the random numbers from the random number generator. Hereinafter, a signal subjected to the scramble processing as described above is referred to as a scramble signal. The scrambler 24 outputs the scramble signal and the control code to the encoder 25.

The encoder 25 encodes the scramble signal based on the clock signal (CLK), and generates encode signal. For example, the encoder 25 is an 8b/10b encoder, and generates encode signal of 10 bits from the scramble signal of 8 bits. The encoders 25 output these encode signals to the serializer 26.

Next, in order to reduce the number of buses to be used, the serializer 26 (a delay unit) executes parallel-serial conversion on the encode signal of 10 bits, based on an instruction signal from a register B 28. Thereby, data frames related to the encode signals of 10 bits are transmitted from the Tcon 20 to the source drivers 30 by using, for example, CalDriCon (registered trademark) which is a driver interface.

In the liquid crystal television 100 according to Embodiment 1 having the above-described configuration, for example, during the communication of the data frames between the Tcon 20 and the source drivers 30, scramble processings are performed at a different timing in communication times of the data frames for each bus. Thereby, an occurrence of EMI noise in the communication through the plurality of buses between the Tcon 20 and the source drivers 30 may be suppressed as much as possible, which will be described in detail below.

In the liquid crystal television 100 according to Embodiment 1, the serializer 26 of the Tcon 20 shifts (delays) leading portions of the data frames at a prescribed timing for each bus.

FIG. 3 is a timing chart describing processing in which the serializer 26 in the liquid crystal television 100 according to Embodiment 1 shifts timings of the leading portions of the data frames. In the timing chart, horizontal axes represent time and vertical axes represent each bus.

More specifically, the serializer 26 generates an output delay by nUIs between arbitrary two buses with respect to the leading portions of the data frames, in other words, the data frames themselves. Herein, the "n" is an integer, provided that the "n" is not 0 when the output delay is generated between arbitrary two or more buses. In addition, the "UI" is one cycle of a data rate, in other words, a minimum unit of transmitting the data frame.

As illustrated in FIG. 3, for example, a data frame output of a first bus (hereinafter, 1st bus) is not delayed, and a data frame output of a 2nd bus is delayed by 3 UIs, therefore the leading portion of the data frame is shifted as much as the 3 UIs. In addition, since the scramble processing is performed at the leading portion in any of the data frames, timing of the scramble processing in the communication time (including delay time) is different between the 1st bus and the 2nd bus.

That is, since the leading portion of the data frame of the 2nd bus is shifted by 3 UIs as compared with the 1st bus, the scramble processing is performed at a timing different by 3 UIs.

Further, a data frame output of a 24th bus is delayed by 2 UIs, and also between the 2nd bus and the 24th bus, the timing of the scramble processing is different from each other. In other words, since the leading portion of the data frame of the 2nd bus is shifted by 1 UI as compared with the 24th bus, the scramble processing is performed at a timing different by 1 UI.

Therefore, in the liquid crystal television 100 according to Embodiment 1, it is possible to prevent that the same data are simultaneously outputted in a plurality of buses, and achieve an effect of minimizing an occurrence of the EMI noise as much as possible.

As described above, such an effect is obtained by causing an output delay by nUIs to be generated between arbitrary two buses with respect to the leading portions of the data frames, in other words, the data frames themselves, and the "n" is an integer, provided that the "n" is not 0 when the output delay is generated between arbitrary two or more buses. That is, it is not always necessary to cause the output delay by nUIs to be generated between arbitrary two buses, and the output delay by nUIs may be generated only in a part of all the buses. In other words, it may be configured to generate an output delay by nUIs between at least a pair of buses.

Figure 4A:
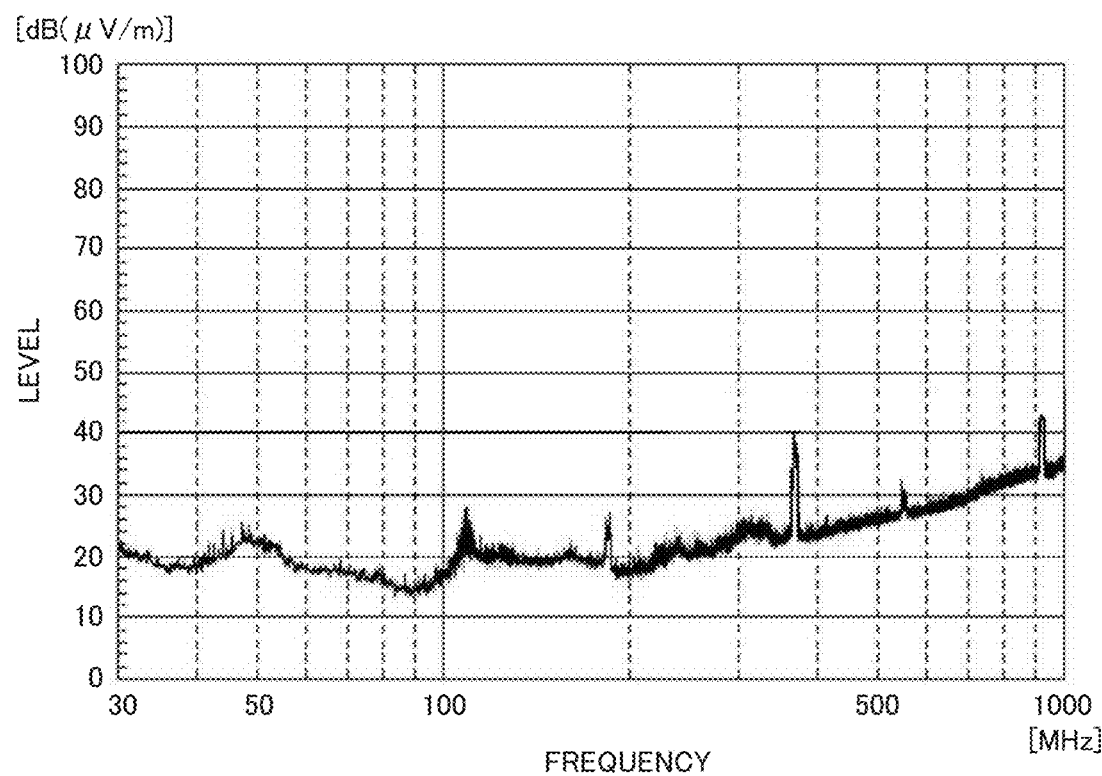
FIGS. 4A-4B are graphs illustrating EMI measured results in a case in which the processing for shifting the timings of the leading portions of the data frames by the serializer is not performed, in the liquid crystal television according to Embodiment 1.
Figure 4B:
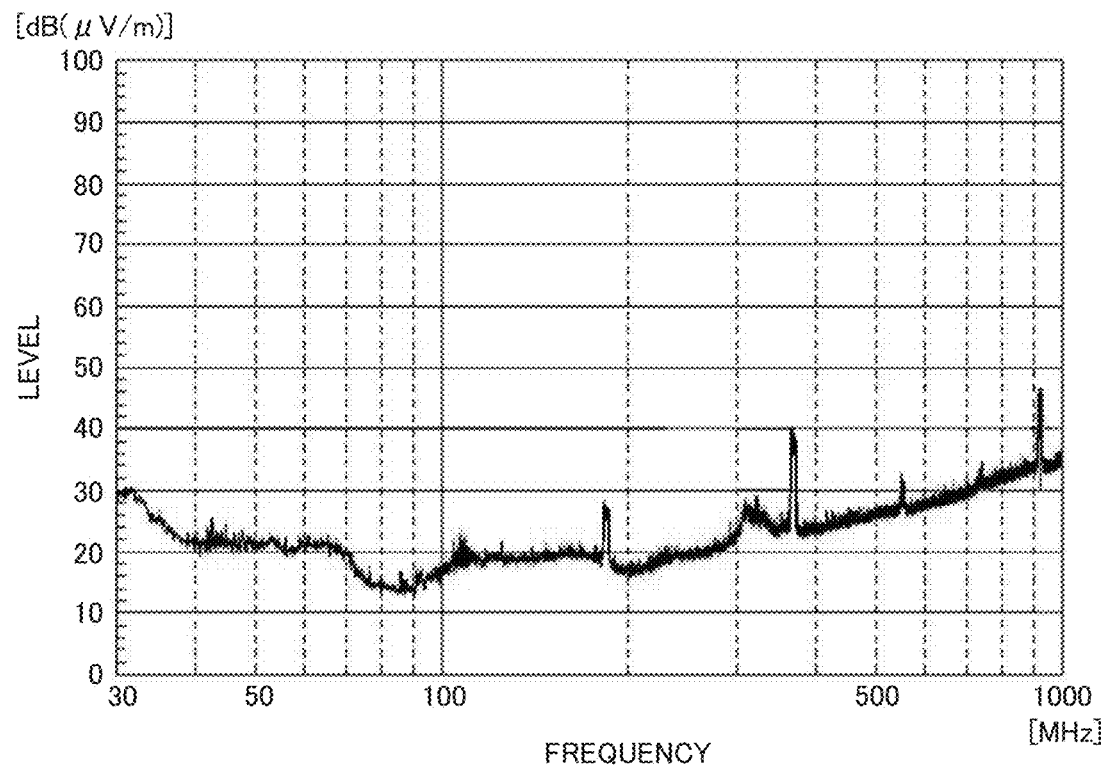
Figure 5A:
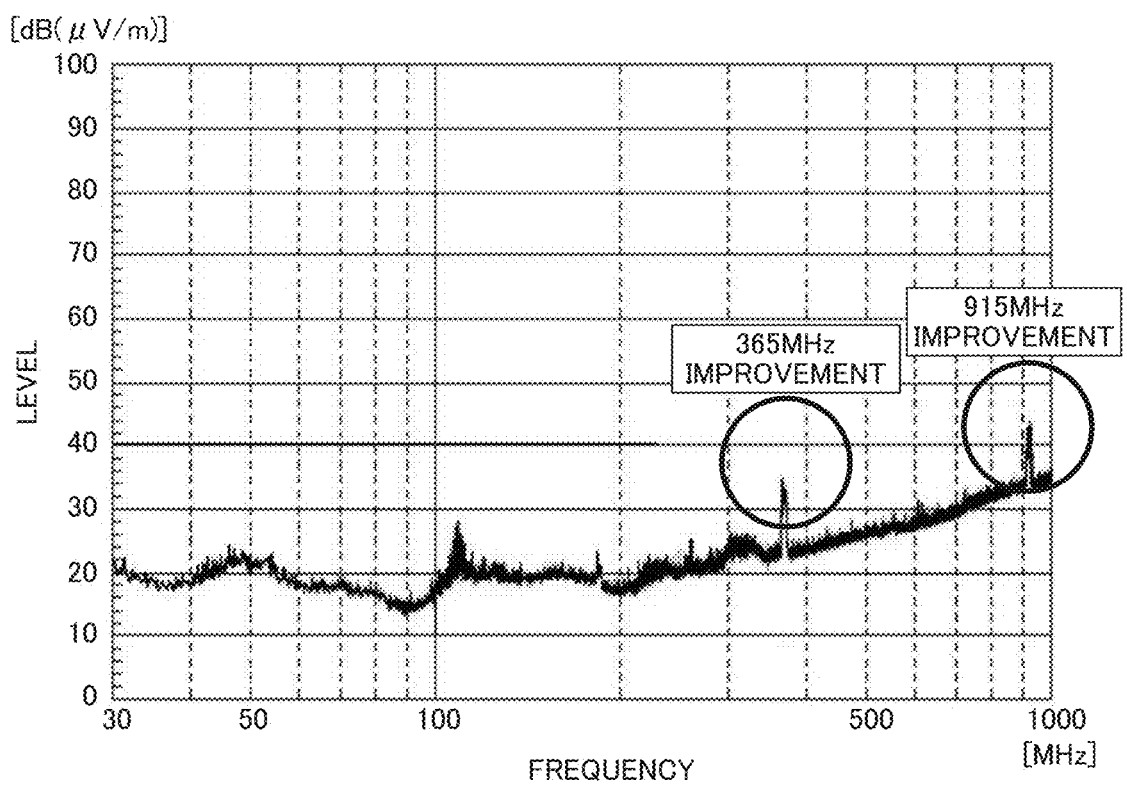
FIGS. 5A-5B are graphs illustrating the EMI measured results in a case in which the processing for shifting the timings of the leading portions of the data frames by the serializer is performed, in the liquid crystal television according to Embodiment 1.
Figure 5B:
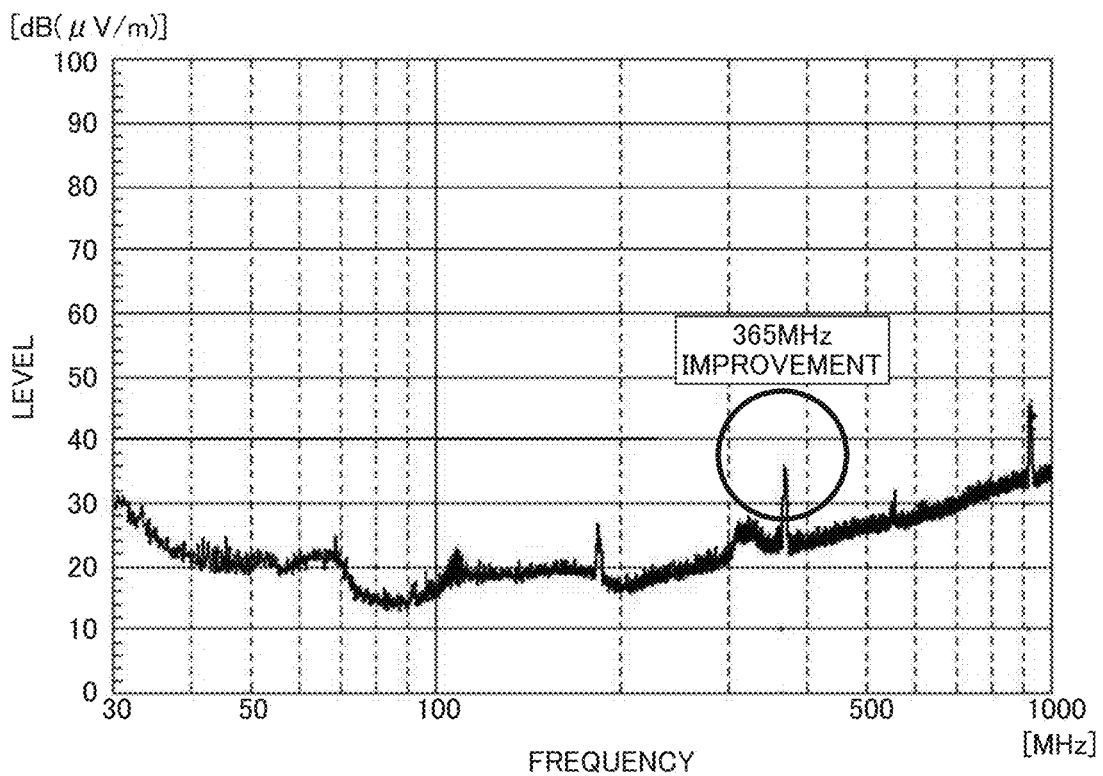
Figure 7:
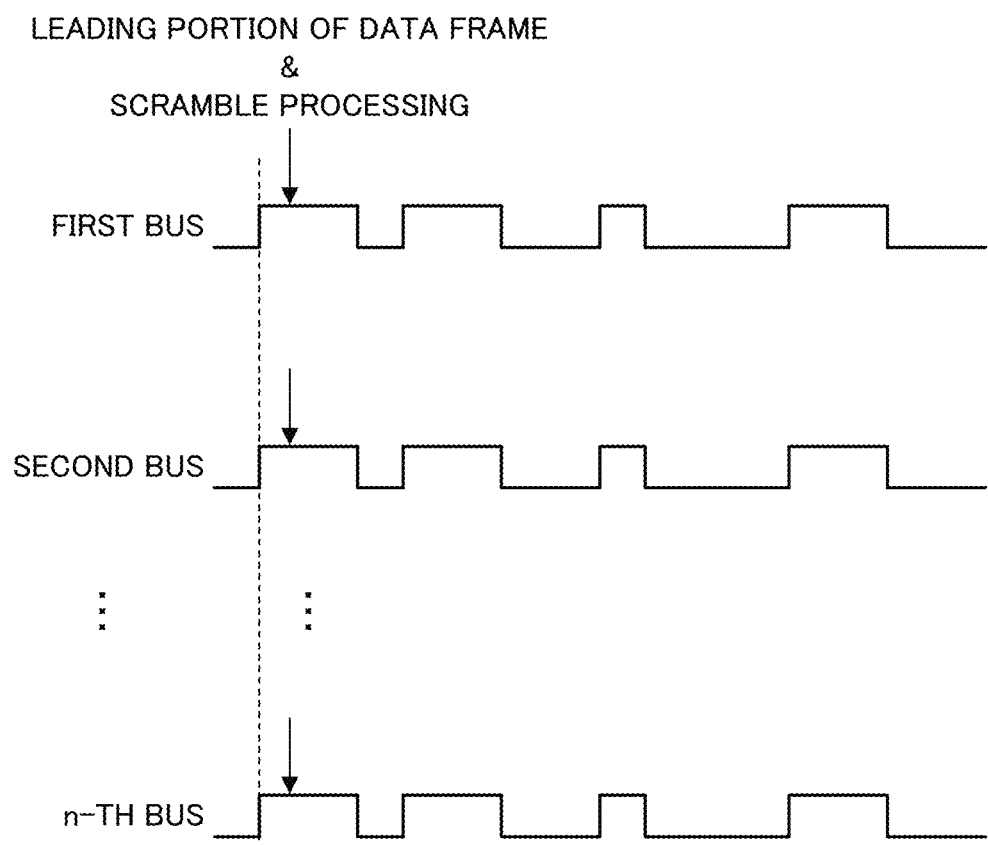
FIG. 7 is a timing chart describing a problem of a conventional scramble processing.

FIGS. 4A and 4B are graphs illustrating EMI measured results in a case in which the processing for shifting the timings of the leading portions of the data frames by the serializer 26 is not performed, in the liquid crystal television 100 according to Embodiment 1, and FIGS. 5A and 5B are graphs illustrating the EMI measured results in a case in which the processing for shifting the timings of the leading portions of the data frames by the serializer is performed, in the liquid crystal television according to Embodiment 1. In addition, FIGS. 5A and 5B illustrate a case in which an output delay by nUIs is generated only in a part of all the buses.

In FIGS. 4A-4B and 5A-5B, the horizontal axis represents a frequency, and the vertical axis represents a level (intensity), respectively. A in FIGS. 4A-4B and 5A-5B is a case in which a measurement antenna is horizontal, and B of FIGS. 4A-4B and 5A-5B is a case in which the measurement antenna is vertical, respectively.

As can be seen from FIGS. 4A-4B and 5A-5B (in particular, see circle portions in FIG. 5A-5B), the EMI noise is more reduced at 365 MHz to 915 MHz in the case in which the processing is performed by the serializer 26 than the case in which the processing is not performed, which indicates that the processing is effective for suppressing an occurrence of the EMI noise.

(Embodiment 2)

The present invention is not limited to the liquid crystal television 100 described in Embodiment 1.

In a liquid crystal television 100 according to Embodiment 2, each of scramblers 24 is configured so as to perform scramble processing at a different timing for each bus. Thereby, during the communication of the data frames between the Tcon 20 and the source drivers 30, the scramble processings may be performed at a different timing in the communication times of the data frames for each bus, which will be described in detail below.

In the liquid crystal television 100 according to Embodiment 2, there is no delay in the output of data frame in each bus, but the scramble processings are performed on the data frames at a respectively different timing by each scrambler 24 corresponding to each bus.

FIG. 6 is a timing chart describing processing in which each scrambler 24 of the liquid crystal television 100 according to Embodiment 2 performs the scramble processing at a different timing. In the timing chart, the horizontal axes represent time and the vertical axes represent each bus.

More specifically, each scrambler 24 performs the scramble processing on the corresponding data frame such that a timing difference by nUIs is generated between the data frames of arbitrary two buses. Herein, the "n" is an integer, provided that the "n" is not 0 when the timing difference is generated between arbitrary two or more buses. In addition, the "UI" is one cycle of the data rate, in other words, the minimum unit of transmitting the data frames.

As illustrated in FIG. 6, since there is no delay in the output of the data frame in each bus, the leading portions (white arrows) of each data frame are located at the same time. However, since the scramble processings are performed on the data frames so as to generate a timing difference by nUIs for each bus, the timings (arrows) of the scramble processings thereon are different for each bus.

For example, the 1st bus is subjected to the scramble processing on the leading portion of the data frame, and the 2nd bus is subjected to the scramble processing after 3 UIs. That is, there is a difference in the timings of the scramble processings by 3 UIs between the 1st bus and the 2nd bus.

In addition, the 24th bus is subjected to the scramble processing after 2 UIs as compared to the 1st bus and before 1 UI as compared to the 2nd bus. That is, there is a difference in the timings of the scramble processings by 1 UIs between the 2nd bus and the 24th bus.

Therefore, also in the liquid crystal television 100 according to Embodiment 2, as similar to the case of Embodiment 1, it is possible to prevent that the same data are simultaneously outputted in a plurality of buses, and achieve the effect of minimizing the occurrence of the EMI noise as much as possible.

Further, as described above, such an effect is obtained by performing the scramble processing so as to generate the timing difference by nUIs between the data frames of arbitrary two buses. Herein, the "n" is an integer, provided that the "n" is not 0 when the timing difference is generated between arbitrary two or more buses. That is, it is not always necessary to perform the above-described scramble processing so as to generate the timing difference by nUIs between the data frames of arbitrary two buses, and the scramble processing may be performed only in a part of all the buses. In other words, the scramble processing may be performed so as to generate the timing difference by nUIs between at least a pair of buses.

The same parts as those in Embodiment 1 will be denoted by the same reference numerals, and will not be described in detail.

In the above description, the case, in which, during the communication of the data frames between the Tcon 20 and the source drivers 30, the timings of the scramble processings are shifted by the Tcon 20 (the scrambler 24 or serializer 26), has been described, but the present invention is not limited thereto.

The present invention may be also applied to the communication between the TVSoC 10 and the Tcon 20. Similar to the Tcon 20 and the source drivers 30, since the TVSoC 10 and the Tcon 20 are connected by a plurality of buses, the EMI noise may occur.

Accordingly, the TVSoC 10, which is a transmission side, performs the processing for shifting the timing of the scramble processing by the scrambler 24, or the processing of the output delay by the serializer 26, and thereby it is possible to minimize an occurrence of the EMI noise in the communication between the TVSoC 10 and the Tcon 20.

In addition, at this time, the DeSkew 21 in the Tcon 20 may be configured so as to perform processing to remove a deformation of the signal (data) from the TVSoC 10. That is, the DeSkew 21 is configured so as to remove a change due to the above-described processing from the signal transmitted from the TVSoC 10 on which the processing for shifting the timing of the scramble processing or the processing of the output delay is executed.

In other words, at this time, the DeSkew 21 serves as a release unit described in the claims.

It is noted that, as used herein and in the appended claims, the singular forms "a", "an", and "the" include plural referents unless the context clearly dictates otherwise.

As this invention may be embodied in several forms without departing from the spirit of essential characteristics thereof, the present embodiments are therefore illustrative and not restrictive, since the scope of the invention is defined by the appended claims rather than by the description preceding them, and all changes that fall within metes and bounds of the claims, or equivalence of such metes and bounds thereof are therefore intended to be embraced by the claims

The invention claimed is:

1. An electrical circuit which comprises a transmission unit, and one or a plurality of reception units that performs communication of data frame with the transmission unit through a plurality of buses, and is configured to perform scramble processing during the communication of the data frame, wherein the transmission unit comprises:
    a scramble unit configured to perform, in each bus, the scramble processing on the data frames transmitted through the bus; and
    a delay unit configured to generate an output delay by nUIs (the n is an integer other than 0 and the UI is one cycle of a data rate) with respect to at least one data frame of two data frames which are subjected to the scramble processing, so that timings of leading portion of the two data frames transmitted respectively through two arbitrary buses are different by nUIs from each other between the two arbitrary buses, and
    the scramble processing is started at a different timing between at least two buses, wherein the plurality of buses is located between at least one timing controller and the plurality of reception units, and
    wherein a timing controller transmits the data frames to the buses and the reception units.

2. The electrical circuit according to claim 1, wherein the reception unit releases the scramble processing performed by the scramble unit on data received from the transmission unit.

3. A display apparatus comprising:
    the electrical circuit according to claim 1, and
    a liquid crystal display panel connected to the electrical circuit,
    wherein the liquid crystal display panel displays an image based on data received through the electrical circuit.

4. The electrical circuit according to claim 1, wherein the n is an integer 2 or more.

* * * * *